United States Patent

[11] 3,569,941

[72] Inventors Charles Passmore Randall;
John Williams, Stoke-On-Trent, England
[21] Appl. No. 748,475
[22] Filed July 29, 1968
[45] Patented Mar. 9, 1971
[73] Assignee English Electric Computers Limited
London, England
[32] Priority July 28, 1967
[33] Great Britain
[31] 34723/67

[54] DIGITAL DATA STORAGE APPARATUS
7 Claims, 3 Drawing Figs.

[52] U.S. Cl. .......... 340/172.5
[51] Int. Cl. .......... G06k 7/016, G11b
[50] Field of Search .......... 340/172.5; 235/157; 307/324; 328/151

[56] References Cited

UNITED STATES PATENTS

| | | | |
|---|---|---|---|
| 3,103,000 | 9/1963 | Newman et al. | 340/172.5X |
| Re. 25,527 | 3/1964 | Floros | 340/172.5 |
| 3,138,759 | 6/1964 | Thompson | 307/324X |
| 3,191,058 | 6/1965 | Stone | 307/324X |
| 3,197,739 | 7/1965 | Newman | 340/172.5 |
| 3,239,809 | 3/1966 | Cogar et al. | 340/172.5X |
| 3,245,050 | 4/1966 | McGrogan | 340/172.5 |
| 3,293,555 | 12/1966 | Mazure et al. | 328/151X |
| 3,320,434 | 5/1967 | Ott | 307/324X |
| 3,395,391 | 7/1968 | Gorog et al. | 340/172.5 |
| 3,413,448 | 11/1968 | Rosenblatt | 340/172.5X |
| 3,427,591 | 2/1969 | Nishioka | 340/172.5 |

*Primary Examiner*—Paul J. Henon
*Assistant Examiner*—R.F. Chapuran
*Attorneys*—Misegades and Douglas, Deith Misegades and George R. Douglas, Jr.

ABSTRACT: A digital data storage apparatus having a movable data storage surface and associated read/write heads, which includes a circuit which ensures that characters read from the surface are correctly assembled in a register by staticizing the component bits of each character and by assembling them in the register only when a time delay approximately equal to one-half of the time spacing between characters has elapsed.

Figure 1:
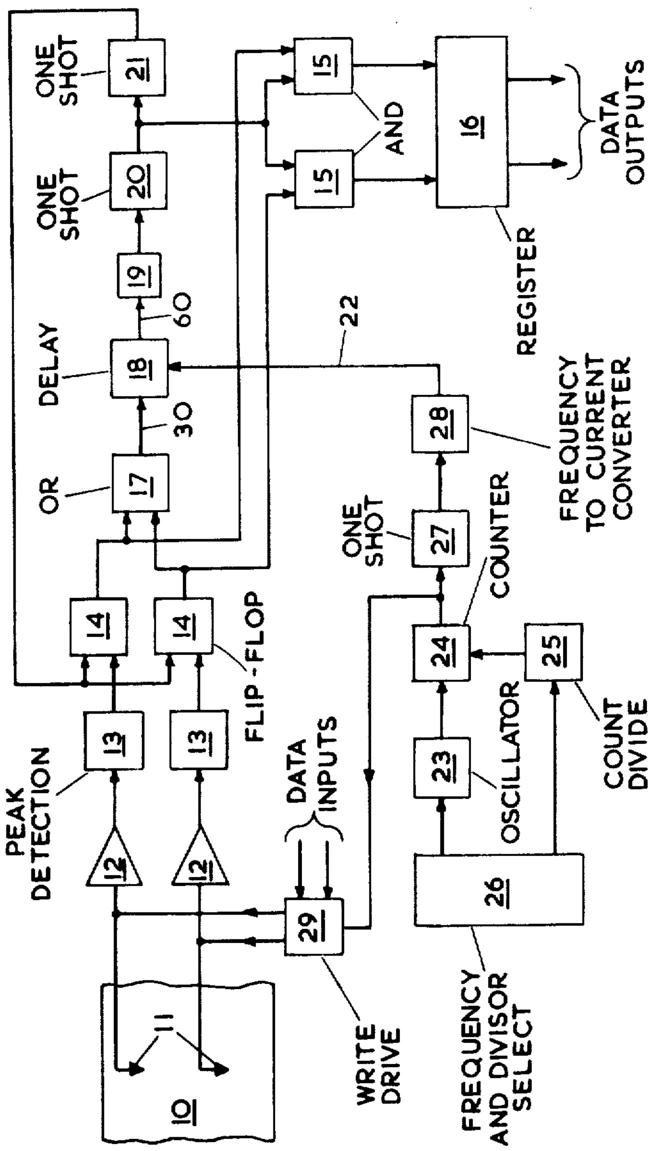

The time delay is character frequency dependent and a particular feature of the described apparatus is that it automatically provides a time delay appropriate to the character frequency being used.

Patented March 9, 1971 3,569,941

3 Sheets-Sheet 2

DIGITAL DATA STORAGE APPARATUS

This invention relates to digital data storage apparatus of the dynamic kind, that is to say, digital data storage apparatus comprising one or more data storage units in which a data storage surface is moved past a plurality of data read/write heads which may be controlled by an associated control circuit tc "write" digital data into, and "read" the data from, the data storage surface.

In the or each unit the data is written into the data storage surface in data characters which are regularly spaced longitudinally of the data storage surface and are each formed of a number of binary digits simultaneously recorded on the data storage surface and usually aligned transversely of the surface.

During data reading the characters are successively scanned as the data storage surface moves past the heads operative for the reading operation, and output indications of binary digits of each character in succession are passed to a data storage register which holds the character until desired.

Ideally for each character the output indications would occur simultaneously, and if that were the case the indications could be passed directly to the register and the character assembled from the indications so received. Due, however, to effects such as tape skew later to be described in detail, the output indications may not be simultaneous, and errors in the characters assembled in the register can occur with some methods of data recording because the characters are badly defined and, particularly where the time spacing of the reading of the characters is small, confusing can result as to which digit belongs to which character.

According to the invention, a digital data storage apparatus of the dynamic kind includes a circuit for ensuring that the characters successively formed and held in the data storage register correspond to the characters recorded on the data storage surface, the said circuit including staticizer means operable during data reading for receiving from the reading heads signals indicative of binary digits of each character and for providing an output indication which is for the time being continuous in response to each signal so received, timing means responsive to the first of the output indications of a character for producing a timing signal for that character after a time delay with respect to the first output indication, equal or approximately equal to half the interval between the passage of successive characters past the reading heads, and AND gating means for receiving the output indications of the character and responsive to the said timing signal for allowing the output indications to pass to the data storage register when the timing signal is produced.

The frequency at which the characters pass the heads, the character frequency, may be fixed or it may be variable.

According to a preferred feature of the invention, in order to accommodate different character frequencies the said time delay is varied in accordance with changes in character frequency, the timing means comprising a first means for producing a first signal having a frequency which is nominally equal to the character frequency, and a delay means responsive to the output signal and to the first of the output indications of each character for producing the timing signal for the character, the first means being controlled in accordance with an indication signal indicative of the character frequency being used whereby the time delay provided has the desired duration.

In most applications, the data storage apparatus will comprise several data storage units controlled by a central controller which includes the control circuits for the units as well as circuits for processing, e.g. storing, the data handled by the units.

According to a further preferred feature of the invention, each unit has a code which characterizes it so far as character density, tape speed etc. are concerned, and is responsive when addressed by the controller to pass to the controller a signal representative of that code. This signal is used in the derivation of the indication signal by which the first means is controlled to provide, the said output signal, a signal having a frequency nominally equal to the character frequency.

Figure 2:
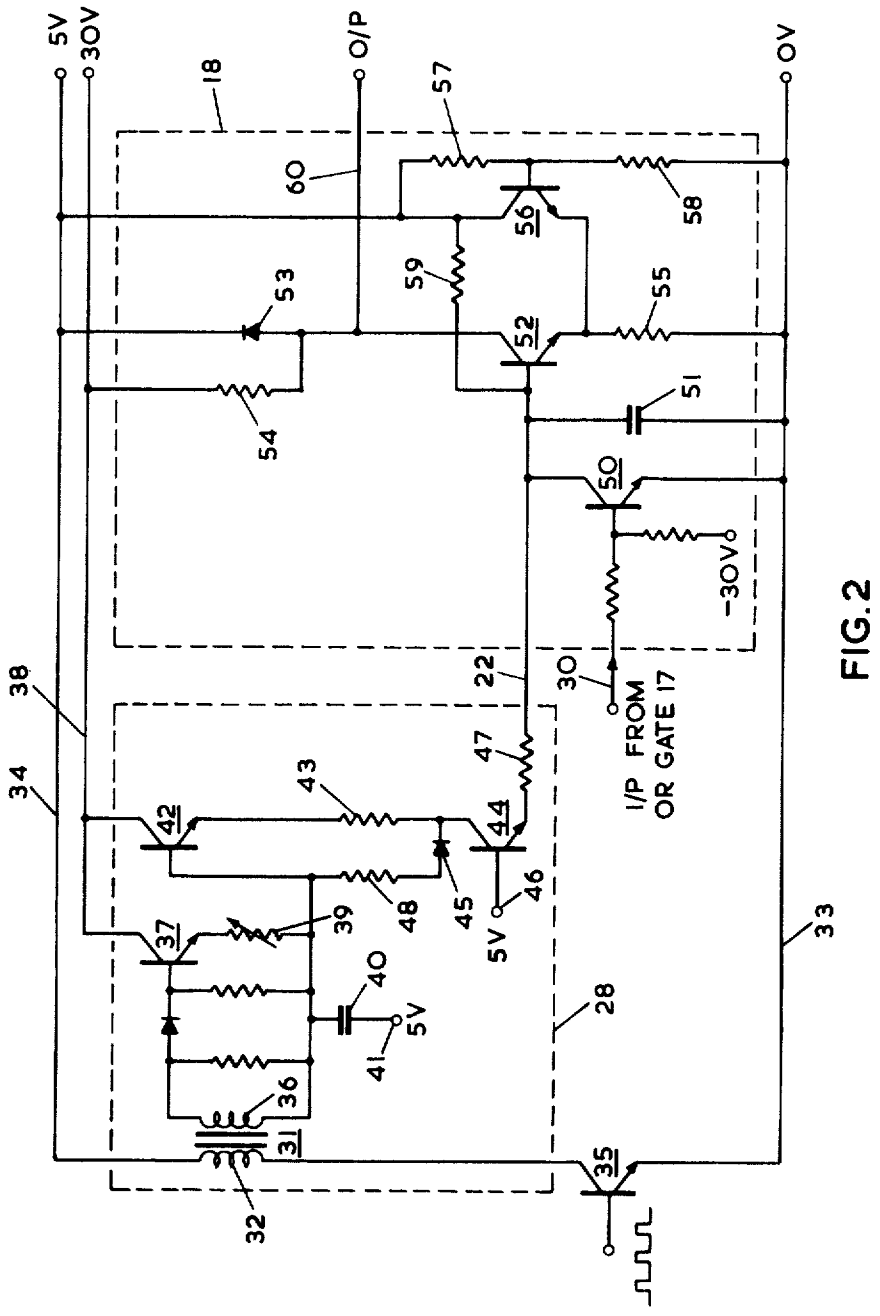
Figure 3:
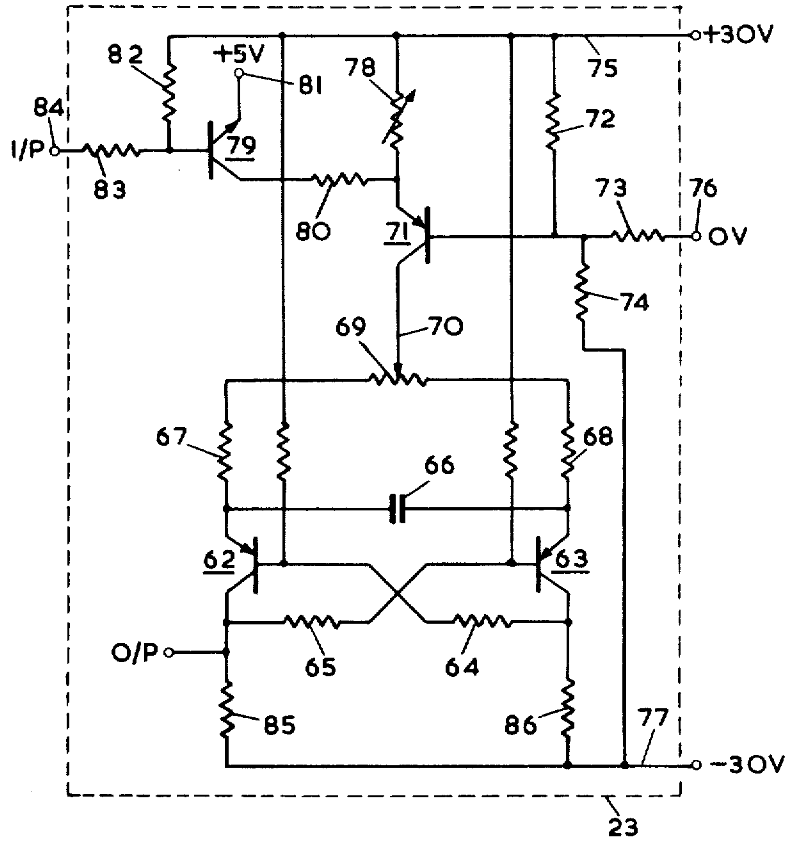

These and other features of the invention will become apparent from the following description, given by way of example and with reference to the accompanying drawings, of a digital data storage apparatus in accordance with the invention. In the drawings:

FIG. 1 shows the block circuit diagram of the relevant parts of the apparatus;

FIG. 2 shows the circuit diagram of the blocks 18 and 28 of the apparatus of FIG. 1; and FIG. 3 shows the circuit diagram of block 23 of the apparatus of FIG. 1.

Referring now to FIG. 1, a magnetic tape unit comprises a movable magnetic tape 10 and seven magnetic read/write heads 11 (of which only two are shown for clarity) spaced apart transversely of the direction of tape movement. Associated with the heads 11 is an associated control circuit by means of which the heads may be controlled to "write" digital data into, or "read" the data from, the tape 10 at seven discrete tracks.

Each head 11 is connected through a respective amplifying and rectifying device 12 to a peak detection circuit 13 and thence to a flip-flop 14. The outputs from the flip-flops 14 are passed to AND gates 15 and thence to a register 16 which holds the outputs until required.

Also connected to the flip-flops 14 is an OR gate 17 having a delay circuit 18 connected to the output thereof through a line 30. The delayed signals from the OR gate 17 are passed via a line 60 to a wave form squaring circuit 19 and thence to two series connected "one shot" circuits 20 and 21 of which the first has its output connected to the AND gates 15 and the second has its output connected as a resetting input to the flip-flops 14.

As will later become apparent from the description to be given with reference to FIG. 2, the time delay provided by the delay circuit 18 is required to be variable, and the timing circuit now to be described operates to control the delay by passing appropriate signals to the circuit 18 along a line 22.

The timing circuit comprises an oscillator 23 of which the oscillating frequency can be controlled to one of two discrete values. Connected to an output of the oscillator is a counter 24.

A "count divide" device 25 is connected to the counter 24 and can be controlled to divide the count in the counter by any from 1 to 16. The magnitude of this integer is determined by an indication signal passed from a circuit 26 which also provides an indication signal to the oscillator to set the oscillating frequency thereof. This circuit 26 is therefore hereinafter to be referred to as the "frequency and divisor selection circuit."

The output from the counter 24 (as divided by the count divide device 25) is passed to a one-shot circuit 27 and thence, via a frequency to current converter 28, to the line 22.

The circuit described above is operative to "read" digital data from the tape 10, as is later to be described in detail, writing of the data on the tape is effected by a write drive circuit 29 which receives the data input signals to be recorded and which is provided with clock signals from the output of the counter 24. As is shown in the drawing, the "writing" of data onto the tape may be performed by the heads 11 which also act to read the data from the tape, and for this purpose the heads 11 are connected to the write drive circuit 29. Alternatively separate heads may be used for data reading and data writing and in such an arrangement the write device circuit 29 would be connected to the heads provided for data writing.

Data writing is performed by part of the circuit of the described embodiment as follows.

The computer operator first decides at what character density the data is to be recorded on the tape, and accordingly manually sets the frequency and divisor selection circuit 26.

Data may be recorded on the tape at one of three character densities, these densities being 200, 556 and 800 characters per tape inch.

As previously stated, the oscillator may be controlled to oscillate at either of two discrete frequencies, these frequencies being 480 kc/sec and 500 kc/sec. If a character density of 200 and 800 characters per inch is desired, then the manual setting of circuit 26 is such that the oscillator is controlled to oscillate at 480 kc/sec if, however, a character density of 556 characters per inch is desired, the oscillator frequency of 500 kc/sec is used.

The counter 24 counts the square wave pulses emitted by the oscillator 23 and is operative, each time an integral number of pulses have been counted to provide a clock pulse to the write drive circuit 29 to cause a data character to be recorded.

At a tape speed of 150 ins/sec and the oscillator set to oscillate at 480 kc/sec the count divide circuit is caused to divide the count in the counter 24 by four to give the character density of 800 characters per inch, i.e.

$$480 \times \frac{10^3}{4} \times \frac{1}{150}$$

or by 16 to give the character density of 200 characters per inch.

At the same tape speed and with the oscillator 23 set to oscillate at 500 kc/sec, the count in the counter is divided by six to give the character density of 556 characters per inch.

In this way characters each formed of a number of bits provided simultaneously as data inputs to the write drive circuit 29 are written onto the tape by the heads 11 at one of the three character densities, 200, 556 and 800 characters per inch.

When it is later required to "read" the characters from the tape the same settings of the circuit 26 and the same tape speed are used so that the frequency of the signals from the counter 24 is nominally the same as the frequency at which characters are read from the tape.

In response to the passage of each binary 1 beneath it, each head 11 generates a pulse of generally gaussian form, it being noted in this respect that the method of data recording is of the "nonreturn to zero" type in which each flux change is indicative of a binary 1.

From each head alternate pulses are of opposite polarity, and the devices 12 serve to rectify and amplify the pulse trains from their respective heads and to pass the trains to the peak detection circuits 13.

The circuits 13 detect the peak magnitudes of the pulses receive in this way and, for each pulse received, generate a pulse of square waveform which is passed to the respective flip-flop 14. The flip-flops 14 are conventional bistable circuits of the nontriggerable variety which are set by each pulse received so as to provide to the respective AND gate 15 an output indication of the respective binary 1, which indication is for the time being continuous. It will therefore be seen that each flip-flop 14 serves to staticize each pulse it receives.

The first of the 1's of a character to be received and staticized by a flip-flop 14 causes the OR gate 17 to produce an output signal. This output signal is passed to the delay circuit 18 which delays the signal by a delay time which is nominally equal to half of the time taken for successive characters to pass the heads 11. To provide such a character frequency dependent time delay the delay circuit 18 is provided on the line 22 with a signal which is derived from the output from the counter 24 by, in series, the one-shot circuit 27 and the frequency to current converter 28.

The frequency of the pulses from the counter 24 is, as previously mentioned, nominally equal to the character frequency. The one-shot circuit 27 produces a one microsecond pulse in response to each pulse received and the frequency to current converter provides on the line 22 as the said signal a unidirectional voltage signal of which the magnitude is proportional to the frequency of the one microsecond pulses. The circuit 28 operates, as required, to delay the signal from the OR gate 17 in proportion to the magnitude of this voltage signal.

The frequency to current converter 28 allows the pulse signals from the counter 24 to be completely asynchronous to the passage of characters past the reading heads.

The delayed signal from the delay circuit 18 is passed to the waveform squaring circuit 19 (which squares the leading edge of the signal) and thence to the one-shot circuit 20. The circuit 20, on receipt of the leading edge of the signal, produces a one microsecond pulse of which the trailing edge gates the AND gates 15 to allow all the staticized signal outputs from the flip-flops 14, i.e. indicative of all the 1's of the character being read, to pass simultaneously for storage to the register 16.

The one-shot circuit 21 is also responsive to the trailing edge of the microsecond signal from the circuit 20 and itself generates a one microsecond pulse of which the trailing edge is used to reset the flip-flops 14 for the next character to be received. Thus characters successively read from the tape 10 are each assembled in the flip-flops 14 and passed for storage to the register 16, the flip-flops 14 being reset one microsecond after each character in turn has been passed to the register.

By thus allowing the digits of a character to pass to the register 16 only when an interval nominally equal to half the time spacing between characters has elapsed after the output indication for the first binary 1, the effects of any nonsimultaneity of the indications of a character are largely eliminated because each character is effectively assembled in the flip-flops 14 before being passed as a whole to the register 16. Such nonsimultaneity can be due to one or more of several effects, two of the most important of which are skewing and twisting of the tape as it passes the heads and movement of the heads from their relative positions during data writing.

A effect which can cause nonsimultaneity of the output indications of a character occurs if the pulses from a head 11 due to two successive binary 1's overlap. The timing of the production of an output indication from the circuit 13 in response to a particular binary 1 is then dependent upon the nature of the digits preceding and succeeding the binary 1 in question, and the random nature of the digits can therefore cause nonsimultaneity of the output indications of each character. Having now described the arrangement and operation of the circuit of FIG. 1, the circuits indicated in FIG. 1 by the reference numerals 18 and 28 will now be described in detail with reference to FIG. 2.

Referring now to FIG. 2, the frequency to current converter 28, comprises an isolating transformer 31 having a 1:1 turns ratio and having its primary winding 32 connected between 0v and 5v lines 33 and 34 in series with an NPN transistor 35. The transistor 35 forms the output stage if the one-shot circuit 27 of FIG. 1 and has applied to its base one microsecond positive going pulses of frequency nominally equal to the frequency at which the characters pass the read/write heads 11.

The secondary winding 36 of the transformer 31 provides a gating signal to a further NPN transistor 37 having its collector connected to a 30v line 38 and having its emitter connected through a variable resistor 39 and a capacitor 40 to a 5v terminal 41.

To the interconnection between the resistor 39 and capacitor 40 is connected a further resistor 48 and the base of an NPN transistor 42 having its collector connected to the 30v line 38. The emitter of this transistor is connected through a resistor 43 to the collector of a further NPN transistor 44, to which the resistor 48 is also connected through a diode 45 which compensates for the base emitter voltage drop of the transistor 42. The base of the transistor 44 is connected to a 5v terminal 46.

The output from the frequency to current converter thus arranged is taken from the emitter of the transistor 44 through a resistor 47 and is passed via the line 22 (see also FIG. 1) to the delay circuit 18.

The delay circuit 18 receives signals on the lines 22 and 30 (FIG. 1) at, respectively, the collector and base of an NPN transistor 50 having its emitter connected to the 0v line 33.

Also connected to the line 22 is a capacitor 51 having its other end connected to the 0v line 33, and the base of an NPN transistor 52. The latter transistor has its collector connected to the 5v line 34 through a diode 53 and to the 30v line 38 through a resistor 54, and its emitter connected to the 0*v* line 33 through a resistor 55.

A further NPN transistor 56, having its emitter also connected to the resistor 55 and its collector connected directly to the 5*v* line 34, has its base biassed to a constant potential by resistors 57 and 58 connected in series across the 0*v* and 5*v* lines 33 and 34 and has its collector also connected through a further resistor 59 to the base of the transistor 52.

The output of the delay circuit is passed along the line 60 (see FIG. 1) from the collector of the transistor 52.

In operation the transistor 35 is gated by each one microsecond pulse applied to its base and a train of 5*v* pulses of square waveform is accordingly applied to the primary winding 32 of the transformer 31. The secondary winding 36 of the transformer therefore generates a corresponding train of 5*v* pulses in response to each pulse for which the transistor 37 becomes conductive.

Thus the emitter current of the transistor 37 has a mean value proportional to the frequency of the pulses provided to the transistor 35 (and hence to the frequency at which data characters pass the read/write heads 11 of FIG. 1).

This emitter current charges the capacitor 40 until a steady state condition is reached when the emitter current passes substantially wholly through the resistor 48. At this steady state condition the voltage of the high voltage end of the resistor 48 is substantially constant and of a magnitude which is proportional to the frequency of the pulses. The voltage across the resistor 48 is then also frequency dependent and is used to gate the transistor 42 so that it acts as a source of frequency dependent current which is applied to the collector of the transistor 44.

Thus in response to the train of one microsecond pulses applied to the transistor 35, the transistor 44 and hence the frequency to current converter 22 provides a current which is proportional to the frequency of the pulses. This current is supplied down the line 22 to the delay circuit 18 which accordingly delays each signal provided from the OR gate 17 on the line 30 (as described with reference to FIG. 1) for a time proportional to the current. Such operation of the delay circuit 18 is now to be described.

Assuming that initially no signal is being supplied from the OR gate 17, and the base of the transistor 50 is therefore at a "low" level, the transistor 50 is conductive and passes substantially the whole emitter current of the transistor 44 to the 0*v* line 33. Under such conditions, substantially zero volts exists across the capacitor 51, transistor 52 is nonconducting and transistor 56 is conducting.

The arrival of a signal from the OR gate 17 causes the base of transistor 50 to go "high," and this transister therefore ceases conduction.

The frequency dependent emitter current of the transistor 44 then begins to charge the capacitor 51 at a rate which is dependent upon the magnitude of the current. When capacitor 51 has charged to the base voltage of the transistor 56, the latter transistor begins to cease conduction and transistor 52 to conduct; the connection of the emitters of these two transistors to the common emitter resistor 55 provides that the effect is cumulative and a fast conduction switch-over between the transistors occurs.

It will therefore be seen that in response to an input signal along the line 30 there appears at the collector of the transistor 52 a negative going signal which lags the input signal by a time proportional to the frequency of the pulses provided to the transistor 35. This negative-going signal is then passed along the line 60 and via the waveform squaring circuit 19 to the one-shot circuit 20 (as has already been described with respect to FIG. 1).

Of the other items shown in the drawing and not so far described, the diode 45 compensates for the base-emitter voltage drop of the transistor 42, and the series connection including the resistor 59 compensates for the sharp fall-off in gain of transistor 50 at low values of the frequency dependent current.

FIG. 3 shows the arrangement of the oscillator 23 of FIG. 1. The oscillator is basically a conventional free running relaxation flip-flop having two PNP transistors 62 and 63. In known manner the base of each transistor is connected through a resistor (64, 65) to the collector of the other transistor, and a capacitor 66 connected between the transistor emitters provides for communication between the transistors.

The output of the oscillator, connected to the counter 24 (FIG. 1), is taken from the collector of the transistor 62.

The supply circuit for the oscillator is arranged as follows. The emitters of the transistors 62 and 63 are connected together by a series connection comprising emitter resistors 67 and 68 and a further resistor 69 having a contact 70.

The contact 70 is connected to the collector of a PNP transistor 71 having its base connected to the star point of a star-connected network of resistors 72, 73 and 74; these resistors respectively have their other ends connected to a +30*v* supply line 75, a 0*v* supply terminal 76 and a −30*v* supply line 77.

To the emitter of the transistor 71 is connected the +30*v* line 75 through a variable resistor 78, and the collector of an NPN transistor 79 through a resistor 80.

The transistor 79 has its emitter connected to a +5*v* supply terminal 81 and has base connected to the +30*v* line 75 through a resistor 82 and through a resistor 83 to a terminal 84 to which is connected the frequency and divisor selection circuit 26 of FIG. 1.

The supply circuit for the multivibrator is completed by the connection of the collectors of the transistors 62 and 63 to the −30*v* line 77 through resistors 85 and 86.

In operation, the oscillator generates at its output and in known manner square wave pulses of mark/space ratio determined by the setting of the contact 70 on the resistor 69.

The frequency of these pulses is basically determined by the rate of charge of the capacitor 66, this in turn being determined by the magnitude of the current supplied from the collector of the transistor 71.

If the oscillator frequency of 500 kc/sec is required the frequency and divisor selection circuit 26 is set in accordance, and the output signal produced by the circuit 26 is then at a low state. The transistor 79 is therefore biassed off and the transistor 71 passes a collector current which is determined almost entirely by the magnitude of the resistance 72 and 78 (which is set accordingly). This high value of collector current causes the oscillator to run at the desired frequency of 500 kc/sec.

If the oscillator frequency of 480 kc/sec is required, the circuit 26 is so set that its output goes to a "high" state and the transistor conducts. By conducting, the transistor bleeds some of the current in the resistor 78 from the emitter of transistor 71 and so reduces the collector current of that transistor. The oscillator is therefore caused to oscillate at the lower frequency of 480 kc/sec.

The values of the resistors 72, 73 and 74 are so chosen that changes in the voltages of the lines 75 and 77 have a minimal effect on the oscillating frequency. It has been found that values of 1.1, 9.1 and 6.8 kilohms respectively for the resistors 72, 73 and 74 are suitable in this respect.

Although the apparatus described with reference to FIG. 1 has the circuits 28 and 18 as particularly shown in FIG. 2 and the circuit 23 as particularly shown in FIG. 3, it will be appreciated that an apparatus in accordance with the invention could comprise circuits other than the circuits of FIGS. 2 and 3. In addition, many variations and modifications are possible for the circuit of FIG. 1 which fall within the scope of the invention.

In the apparatus described with reference to the drawings mention is made of only one tape unit and associated control circuit. Normally the tape unit will be one of several similar units each with a respective control circuit and under the control of a central controller and processor including the control circuits.

The tape units may be arranged all to operate at the same tape speed and at the same character frequency, in which case the control circuits may have items in common and a single fixed frequency oscillator 23 which directly produces timing signals nominally at the character frequency could be used for data writing and for skew delay for all of the units.

More usually, however, the magnetic tape units will be required to operate at different tape speeds and/or character densities so as, inter alia, to provide compatibility with other tape units. In such arrangements the time delay provided by the respective circuits 18 may individually be controlled manually as has been described with reference to the drawings, or they may be controlled automatically.

In a preferred method, such automatic control is provided as follows.

Under software control, the controller and processor addresses a particular magnetic tape unit which accordingly sends back a coded signal indicative of the characteristics of the unit (i.e. tape speed, character density, read and write starting and stopping times etc.). This code is then passed to the appropriate frequency and devisor selection circuit 26 which decodes it and uses it to set the frequency of the oscillator 23 and to control the count divide device 25. Where the coded signal of a magnetic tape unit is required to vary, e.g., if the unit is required to operate at more than one character frequency, the variable part of the code may be stored in the tape unit on flip-flops which can be appropriately set or reset by the controller and processor under software control.

It will be appreciated that in addition to its use for deskewing purposes the automatic control of the frequency of the output from the counter 24 is also used for providing the appropriate clock frequencies for data writing.

In a digital data storage apparatus in accordance with the invention, it is not essential that the same tape speed be used for data reading and writing. Differing speeds of data reading and writing can readily be accommodated by the circuit of FIG. 1, particularly if automatic control as described above is used.

The two one-shot circuits 20 and 21 (FIG. 1) are necessary because the flip-flops 14 are of the DC set and reset variety to give good immunity from noise. If flip-flops of the triggerable variety are used, then only one one-shot circuit need be provided for effecting both data transfer to the register 16 and resetting of the flip-flops 14.

It will be appreciated that although the data storage apparatus described with respect to the drawings used a particular method of data recording of the "non return to zero" variety, the invention may be used in conjunction with other methods of data recording, magnetic or otherwise, for which simultaneous detection of the whole of each character is necessary during data reading.

The circuit FIG. 3 may readily be modified to provide for more than two oscillating frequencies. For example, a third oscillating frequency alternative to those already possible could be provided by the addition of a further transistor similar to the transistor 79 and connected in a like arrangement.

We claim:

1. Digital data storage apparatus including a plurality of data item element tracks; means for reading elements of a data item respectively concurrently from each of said tracks, succeeding elements respectively associated with succeeding data items occurring in a track at a predetermined frequency; registering means connected to the reading means settable to register elements read from the tracks; a pulse generator arranged to generate pulses at a second frequency; a clock train selecting network connected to said pulse generator and arranged to produce from the pulses at said second frequency a train of clock pulses at said predetermined frequency lower than said second frequency; delay means connected to said network, the delay means being responsive to said clock pulses to produce a first signal having a value dependent upon said predetermined frequency, the delay means also being connected to said registering means and being responsive jointly to a second signal derived from said registering means in response to the registration of the earliest occurring element of a data item and to said first signal to produce an output signal after a time delay less than the time period between successive clock pulses; and means responsive to said output signal to read out the elements of a data item in parallel from said registering means.

2. Digital data storage apparatus as claimed in claim 1, in which said clock train selecting network includes means for varying the frequency of clock pulses in said train.

3. Digital data storage apparatus as claimed in claim 2, in which said varying means includes a ring counter driven by said pulses at said second frequency, the counter producing output pulses constituting said clock pulse train respectively at predetermined counts of the counter, and means for varying the counting capacity of the counter to vary the frequency of occurrence of said output pulses.

4. Digital data storage apparatus as claimed in claim 2, in which said pulse generator includes a variable frequency oscillator and in which said varying means includes control means for adjusting the operating frequency of the oscillator.

5. Digital data storage apparatus as claimed in claim 2, including an OR gate connected between said registering means and said delay means, the OR gate being responsive to the earliest occurring element of a data item registered by said registering means to produce said second signal, and means for applying said second signal to said delay means.

6. Digital data storage apparatus as claimed in claim 5 in which said delay means includes means for producing for each clock pulse a square pulse of predetermined magnitude and substantially constant duration; a first capacitor; means for applying said square pulses to charge the first capacitor to a steady state dependent upon the frequency of the clock pulses; and means for producing said first signal proportional to the steady state of the first capacitor.

7. Digital data storage apparatus as claimed in claim 6, in which said delay means further includes a second capacitor; circuit means responsive to said first signal to derive a charging current for said second capacitor; switching means normally operative to cause the charging current to bypass said second capacitor and operable in response to said second signal to permit the charging current to pass to said second capacitor to charge the second capacitor at a rate dependent upon the frequency of the clock pulses; and means operable when the charge on the second capacitor reaches a predetermined level to produce said output signal, the predetermined level being chosen to produce said output signal after a delay period substantially equal to half the time interval between successive clock pulses from the occurrence of said second signal.